Feb. 19, 1963  F. E. FABER  3,078,120
WINDOW GUIDE ROLLER ASSEMBLY
Filed July 3, 1961  2 Sheets-Sheet 2
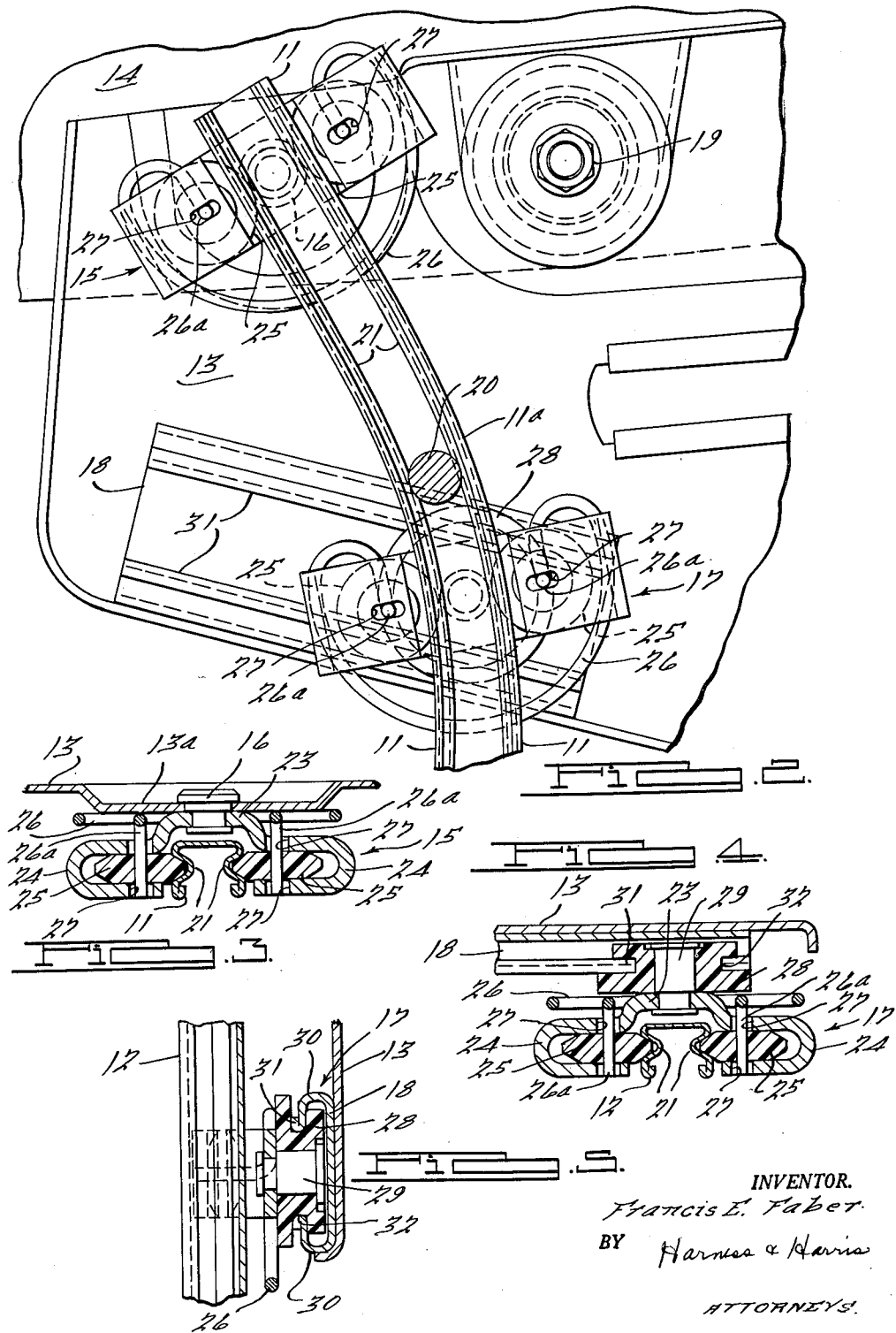
INVENTOR.
Francis E. Faber
BY Harness & Harris
ATTORNEYS.

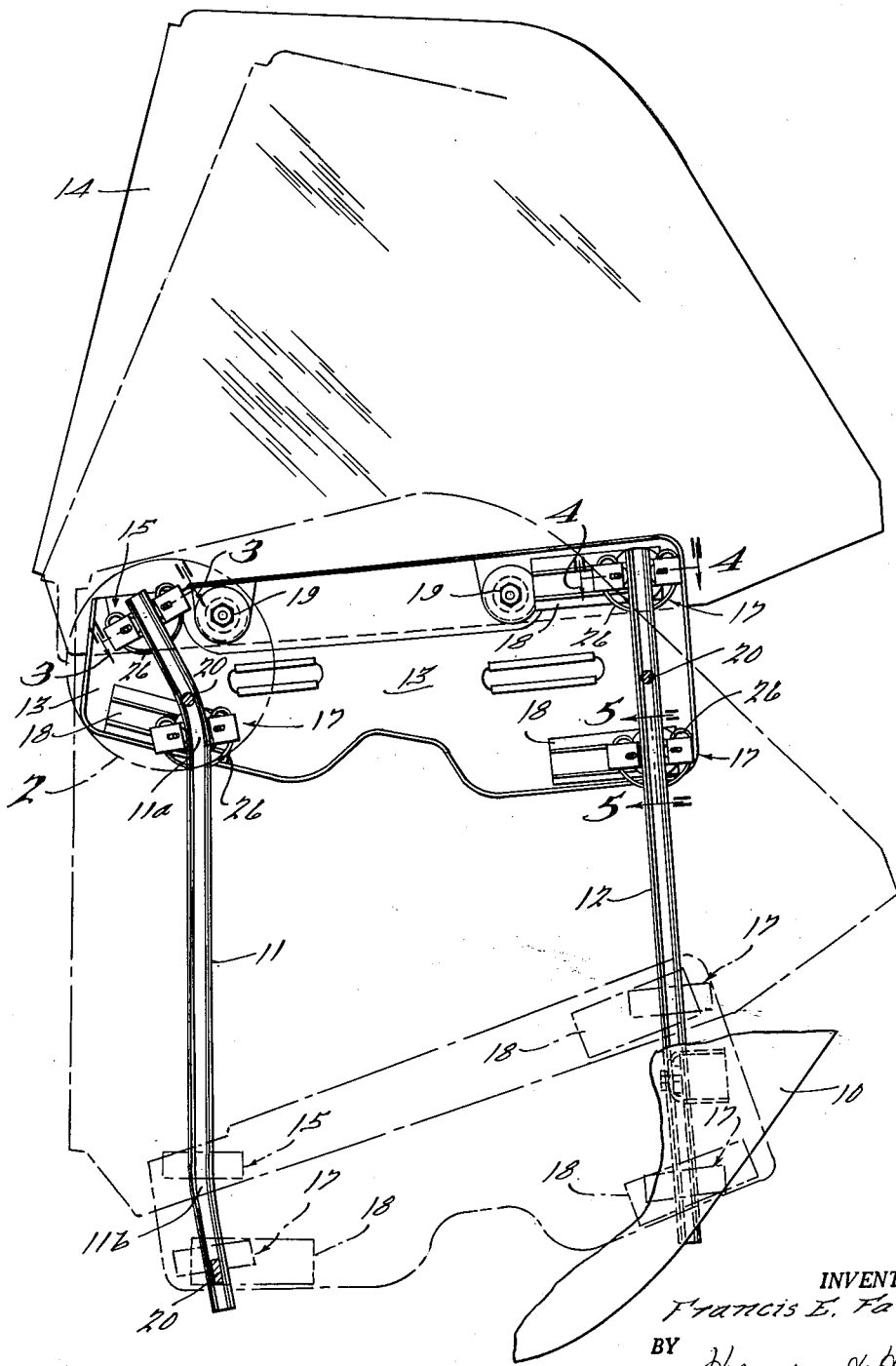

United States Patent Office 3,078,120
Patented Feb. 19, 1963

3,078,120
WINDOW GUIDE ROLLER ASSEMBLY
Francis E. Faber, Grosse Pointe Woods, Mich., assignor to Chrysler Corporation, Highland Park, Mich., a corporation of Delaware
Filed July 3, 1961, Ser. No. 121,525
9 Claims. (Cl. 296—44.5)

This invention relates to improvements in means for supporting and guiding the movement of a window panel for an automobile body and has for an important object the provision of an improved support and guide means for the drop window of a rear quarter panel or rear door of a hard top convertible type automobile, for example, wherein the upper portions of the window panel are unsupported by a door or body frame.

Prior efforts to provide a stable support for such a window, particularly where a compound vertical, horizontal, and swinging movement was required to jockey the window around a body frame structure, resulted in too much friction and cranking effort in raising and lowering the window. It is accordingly another object to provide an improved assembly in a window panel and guide support of the above character which is comparatively simple and economical in construction, yet which efficiently supports the window and enables the latter to be raised or lowered with a minimum of effort. Another and more specific object is to provide such an assembly comprising a pair of upright guide tracks secured to the body structure, one of the tracks being curved to guide the window in a desired compound movement. A separate pair of follower means interengages each track at locations spaced longitudinally thereof. One of the follower means interengaging the curved track is pivotally connected to the window frame to maintain itself in transverse alignment with respect to the curved track upon movement along the latter. Each of the other three follower means is interengaged with a separate transverse track for guided movement therealong in directions transversely of the associated upright guide track, each transverse track being fixedly secured to the window frame. By such a construction, the window frame is secured to the upright guide tracks which in turn are secured to the automobile body structure.

Each follower means comprises a bracket extending transversely of its associated guide track and having a pair of track following rollers interengaged opposite V-shaped channel sides of the guide track. A C-shaped wire spring associated with each pair of rollers extends substantially in the plane of the window panel and terminates at opposite ends in extensions perpendicular to said plane. The associated rollers are journaled on the wire spring extensions and are yieldingly urged into the V-shaped channels at opposite sides of the track.

The bracket of the aforesaid one follower means is pivotally connected to the window frame at a location between its rollers. Each of the other brackets has a third track following roller journaled thereon at a location between the associated first named pair of rollers. Each third roller comprises the interengagement between the associated follower means and transverse track and is interconnected with its transverse track to move therealong in guided relation and also to provide a positive connection between the latter track and associated upright guide track.

By virtue of such a construction, the bracket of each follower means is free to swing about the axis of its pivotal connection with either window frame or the journal axis for the third roller, thereby to enable each bracket to maintain a desired alignment transversely of the associated upright guide track upon movement therealong. Thus binding and frictional engagement between the rollers and tracks are minimized.

Other objects of this invention will appear in the following description and appended claims, reference being had to the accompanying drawings forming a part of this specification wherein like reference characters designate corresponding parts in the several views.

FIGURE 1 is a fragmentary elevational view of a vehicle window panel and guide means embodying the present invention.

FIGURE 2 is an enlarged fragmentary view showing the structure within the circle 2 of FIGURE 1.

FIGURE 3 is an enlarged fragmentary sectional view through the pivotal follower, taken in the direction of the arrows substantially along the line 3—3 of FIGURE 1.

FIGURE 4 is an enlarged fragmentary sectional view through one of the transversely movable followers, taken in the direction of the arrows substantially along the line 4—4 of FIGURE 1.

FIGURE 5 is a fragmentary enlarged sectional view through one of the transversely movable followers, taken in the direction of the arrows substantially along the line 5—5 of FIGURE 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in a roller guide mechanism for the window of a vehicle rear door or quarter panel 10 on which are mounted a pair of generally upright fixed guide tracks 11 and 12. The tracks 11 and 12 are connected to a shiftable supporting frame 13 of a window panel 14 by means of a pivotal follower 15 and three transversely shiftable followers 17. The follower 15 is pivotally connected by means of a pin 16 to an embossment 13a of frame 13, FIGURE 3. The three followers 17 are secured to the panel 13 by means of three transverse guide tracks 18, FIGURES 4 and 5. The window panel 14 is suitably secured to the bottom frame 13 by means of a pair of bolt and washer assemblies 19.

The tracks 11 and 12 are secured to and spaced from the quarter panel 10 by means of suitable spacers 20 so as to extend substantially in a common plane regardless of the curvature of panel 10. Each track 11 or 12 is preferably formed from sheet steel strips to provide a laterally opening V-type groove or channel 21 in each side. The upper and lower portions of track 11 are curved at 11a and 11b respectively in order to effect a suitable lateral and rotational movement of the window panel 14, as for example around a body pillar, when the panel 14 is raised or lowered. By virtue of the structure to be described, track 12 is straight.

The follower 15 comprises a sheet metal bracket 23 extending transversely of track 11 and having a central boss pivotally connected positively to the embossment 13a by the aforesaid pin 16. Opposite lateral ends of the bracket 23 of follower 15 are bent inwardly toward track 11 to provide a pair of channel portions 24 opening toward the oppositely directed V-shaped channels 21. A pair of roller followers 25 having tapered peripheries interlocked with the V-shaped channels 21 of track 11 are journaled on a pair of end extensions 26a of a C-shaped wire spring 26.

Spring 26 extends generally parallel to the plane of the tracks 11 and 12 perpendicularly to the extensions 26a. The latter project through lost motion slots 27 extending transversely of the track 11 within opposite sides of each bracket channel 24. The spring 26 is under tension yieldingly urging the extensions 26a toward each other, thereby to urge the rollers 25 into interlocking engagement within the grooves 21 of track 11. By virtue of pivot 16 having its axis parallel to the axes of the extensions 26a and located midway between the latter, the bracket 23 is free to swing to a position aligned transversely with respect to the length of track 11.

Each of the followers 17 is similar to the follower 15 and includes a bracket 23 having the inwardly directed channels 24 for paired roller followers 25 journaled on the extensions 26a of a C-shaped spring 26. Instead of the pivot 16, each follower 17 carries a third roller 28 journaled at a pin 29 at the central region of the bracket 23 midway between the rollers 25, the axis of the pin or spindle 29 being parallel to the axes of the projections 26a.

Each of the transverse tracks 18 is formed from sheet metal to provide a pair of guide channel portions 30 opening toward each other and the associated spindle 29, FIGURE 5, and is suitably welded at its intermediate region between the channels 30 to the frame 13. Opposite edges of each track 18 terminate in reversely bent reinforcing flanges 31 to provide reinforced thickened edges adapted to ride within an annular groove 32 formed in the periphery of the associated follower 28. Thus the roller followers 28 are secured by the journal pins 29 to their associated brackets 23 and are also positively interlocked with the associated transverse track 18. This structure in cooperation with the pivot 16 positively secures the window frame 13 to the tracks 11 and 12 for guided movement therealong.

The mechanism for regulating the position of the window may be conventional and accordingly is not illustrated herein. It is sufficient to note that as the window is raised or lowered and the follower 15 moves along the curved track portions 11a and 11b, the latter follower will swing to a position of transverse alignment with the track 11 and will shift the frame 13 laterally in accordance with the curvature of the track. In this regard the lateral movement of frame 13 is permitted by virtue of the roller followers 28 moving along their respective transverse tracks 18. Also as the frame 13 shifts laterally and moves vertically, a predetermined swinging movement of the frame 13 will result depending upon the curvature of track 11. This swinging movement is permitted by reason of roller followers 28 pivotally connected by the pins 29 to the associated brackets 23.

I claim:
1. In a vehicle body having a pair of guide tracks secured thereto, a shiftable window frame, a separate pair of follower means associated with each guide track at locations spaced longitudinally of the track and interengaging the track to ride therealong in guided relation, one of said follower means being pivotally secured to said frame, a separate transverse track associated with each of the other follower means and secured to said frame to extend transversely of the guide track along which the associated follower means rides, and a separate roller pivotally connected with each of said other follower means to enable pivoting of the latter to a predetermined position of alignment with respect to its associated guide track, each roller interengaging the associated transverse track to ride therealong in guided relation.

2. In a vehicle body having a pair of guide tracks secured thereto, one of said tracks being curved, a shiftable window frame, a separate pair of follower means associated with each guide track at locations spaced longitudinally of the track and interengaging the track to prevent separation therefrom and to ride therealong in guided relation, one of said follower means being associated with the curved guide track and being pivotally secured to said frame to pivot about the axis of its connection with said frame to a predetermined position of alignment with respect to said curved track, a separate transverse track associated with each of the other follower means and secured to said frame to extend transversely of the guide track along which the associated follower means rides, and a separate roller pivotally connected with each of said other follower means to enable pivoting of the latter to a predetermined position of alignment with respect to its associated guide track, each roller engaging the associated transverse track to ride therealong in guided relation and being secured to its associated follower means and transverse track to prevent separation thereof.

3. In a vehicle body structure, a pair of guide tracks secured to said body, a shiftable window frame, a separate pair of follower means associated with each guide track at locations spaced longitudinally of the track, each follower means comprising a bracket having a pair of followers engaging opposite sides of the associated track to ride therealong in guided relation, one of said brackets being pivotally connected to said frame, a separate transverse track associated with each of the other follower means and secured to said frame to extend transversely of the guide track along which the associated follower means rides, the bracket of each of the other follower means having a third follower thereon engaging the associated transverse track to ride therealong in guided relation, each third follower comprising a roller journalled on its bracket at a location between the first named pair of followers on that bracket to enable pivoting of that bracket to a predetermined position of alignment with respect to the associated guide track, each roller being secured to its bracket and associated transverse track to prevent separation thereof.

4. In a vehicle body structure, a pair of guide tracks secured to said body, a shiftable window frame, a separate pair of follower means associated with each guide track at locations spaced longitudinally of the track, each follower means comprising a bracket having a pair of followers engaging opposite sides of the associated track to ride therealong in guided relation, one of said brackets being pivotally connected to said frame, a separate transverse track associated with each of the other follower means and secured to said frame to extend transversely of the guide track along which the associated follower means rides, the bracket of each of the other follower means having a third follower thereon engaging the associated transverse track to ride therealong in guided relation, the guide track associated with the pair of follower means having the bracket pivotally connected to said frame being curved, the latter bracket being pivotally connected to said frame at a location between the first named pair of followers thereon to swing to positions transversely of the curved guide track upon movement therealong, the third follower on the bracket of the other of the last named pair of follower means engaging its associated transverse track at a location between the first named pair of followers on the last named bracket, said last named bracket being pivotal about an axis through said location to positions transversely of the curved track upon movement therealong.

5. In the combination according to claim 4, said followers interengaging said tracks to connect said frame and guide tracks against movement at right angles to both said guide and transverse tracks, and resilient means yieldingly urging the guide track followers into interengagement with the associated guide track.

6. In a vehicle body structure, a pair of guide tracks secured to said body, a shiftable window frame, a separate pair of follower means associated with each guide track at locations spaced longitudinally of the track, each follower means comprising a bracket having a pair of rollers engaging opposite sides of the associated track to ride therealong in guided relation, a C-shaped wire spring associated with each bracket and the latter's rollers, each C-shaped spring having a pair of ends extending at right angles to the plane of the C and projecting through lost motion slots in the associated bracket and through axial openings respectively in the associated pair of rollers to comprise journals for said rollers, each spring being under tension urging the rollers journaled thereon against the opposite sides of the associated track, one of said brackets being pivotally connected to said frame, a separate transverse track associated with each of the other follower means and secured to said frame to extend transversely of the guide track along which the associated follower means rides, the bracket of each of the other follower means having a third follower thereon engaging the associated transverse track to ride therealong in guided relation.

7. In a vehicle body structure, a pair of guide tracks secured to said body, a shiftable window frame, a separate pair of follower means associated with each guide track at locations spaced longitudinally of the track, each follower means comprising a bracket having a pair of rollers engaging opposite sides of the associated track to ride therealong in guided relation, a C-shaped wire spring associated with each bracket and the latter's rollers, each C-shaped spring having a pair of ends extending at right angles to the plane of the C and projecting through lost motion slots in the associated bracket and through axial openings respectively in the associated pair of rollers to comprise journals for said rollers, each spring being under tension urging the rollers journaled thereon against the opposite sides of the associated track, one of said brackets being pivotally connected to said frame at a location between its pair of rollers to swing to positions transversely of the associated guide track, a separate transverse track associated with each of the other follower means and secured to said frame to extend transversely of the guide track along which the associated follower means rides, the bracket of each of the other follower means having a third follower thereon at a location between its pair of rollers and engaging the associated transverse track to ride therealong in guided relation, each of the latter three brackets being pivotal about its third follower to swing to positions transversely of its associated guide track upon movement therealong.

8. In combination, a guide track, follower means comprising a bracket having a pair of rollers engaging opposite sides of the said track to ride therealong in guided relation, a C-shaped wire spring having a pair of ends extending at right angles to the plane of the C and projecting through lost motion slots in the said bracket and through axial openings respectively in said pair of rollers to comprise journals for said rollers, said spring being under tension urging the rollers journalled thereon against the oposite sides of said track.

9. In combination, a guide track, follower means comprising a bracket having a pair of rollers engaging opposite sides of the said track to ride therealong in guided relation, a C-shaped wire spring having a pair of ends extending at right angles to the plane of the C and projecting through lost motion slots in the said bracket and through axial openings respectively in said pair of rollers to comprise journals for said rollers, said spring being under tension urging the rollers journalled thereon against the opposite sides of said track, a transverse track extending transversely of said guide track, said bracket having a third roller rotatably secured thereon at a location between said pair of rollers and engaging said transverse track to ride therealong in guided relation.

References Cited in the file of this patent

UNITED STATES PATENTS

| | | |
|---|---|---|
| 2,390,271 | Rappl | Dec. 4, 1945 |
| 2,763,508 | Gelfand | Sept. 18, 1956 |
| 2,798,761 | Himka | July 9, 1957 |
| 2,901,244 | Jones | Aug. 25, 1959 |
| 2,992,039 | Bretzner | July 11, 1961 |